July 31, 1923.

J. G. TANGAUY 1,463,538

LIFTING TRUCK

Filed May 24, 1920

INVENTOR
JOSEPH G. TANGAUY

Joseph J. O'Brien
ATTORNEY

July 31, 1923.
J. G. TANGAUY
LIFTING TRUCK
Filed May 24, 1920
1,463,538
2 Sheets-Sheet 2
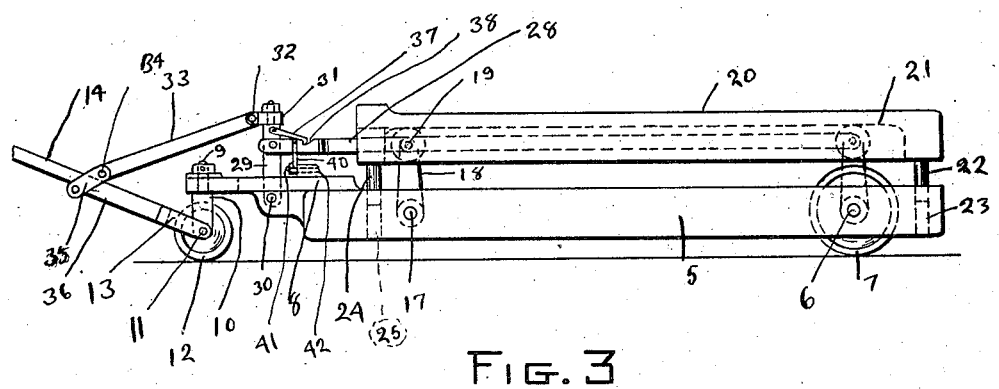
FIG. 3
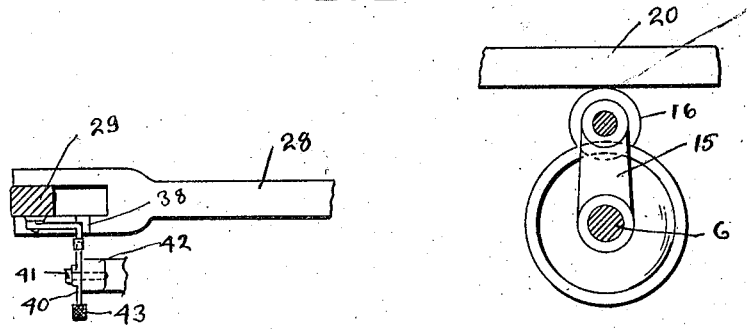
FIG. 4
FIG. 5
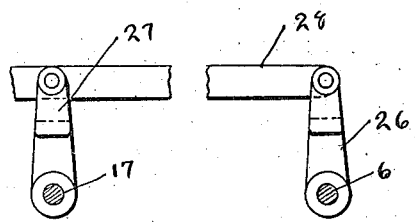
FIG. 6
INVENTOR
JOSEPH G. TANGAUY
Joseph J. O'Brien
ATTORNEY Patented July 31, 1923.

1,463,538

UNITED STATES PATENT OFFICE.

JOSEPH G. TANGAUY, OF HOLYOKE, MASSACHUSETTS.

LIFTING TRUCK.

Application filed May 24, 1920. Serial No. 383,880.

*To all whom it may concern:*

Be it known that JOSEPH G. TANGAUY, a citizen of Canada, residing at Holyoke, in the county of Hampden and State of Massachusetts, has invented certain new and useful Improvements in Lifting Trucks, of which the following is a specification.

This invention relates to improvements in lifting or elevating trucks and its leading object is to provide a truck of this type with a vertically movable or elevating platform and means for moving the same vertically without shifting the elevating platform longitudinally or otherwise upon the truck body or base platform.

Another object of the invention is to provide a simple locking device for holding the elevated platform in elevated position.

Another object of the invention is to provide means for operating the platform elevating means from the draft pole.

With the above and other objects in view this invention relates to certain new and useful constructions, combinations and arrangements of parts, clearly described in the following specification and fully illustrated in the accompanying drawings, in which:

Figure 3 is a side elevation showing the elevating platform in its raised position.

Figure 4 is a detail view showing the connection between the lifting cranks and the operating levers and also the latch releasing device.

Figure 5 is a detail view showing one of the levers and its roller for operating the elevating platform.

Figure 6 is a detail view showing the rod connecting the forward and rear levers for elevating the movable platform.

Figure 1:
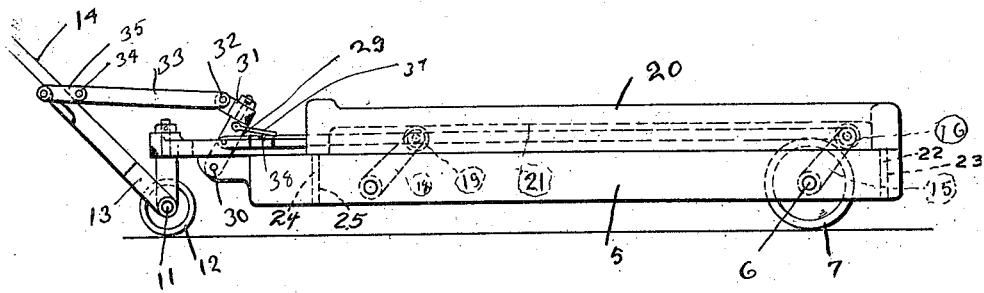
Figure 1 is a side elevation showing the elevating platform in its lowered position.
Figure 2:
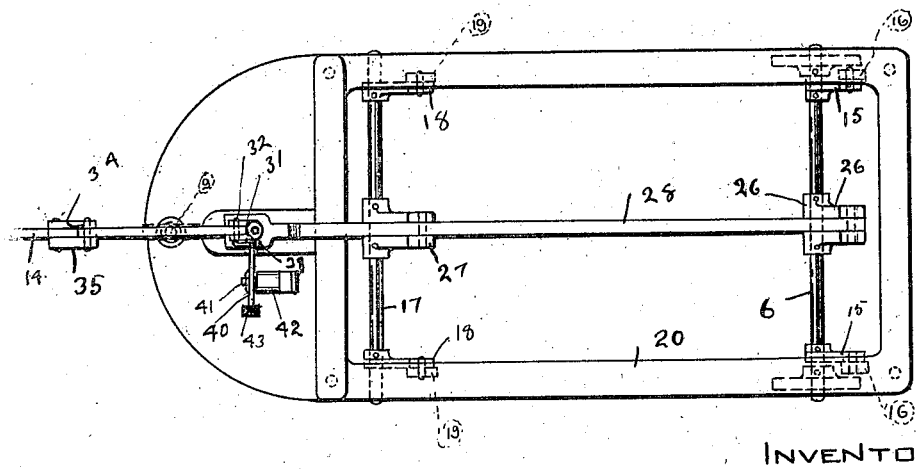
Figure 2 is a top plan view thereof.

Referring to the accompanying drawings 5 designates the body or base platform of the truck which is supported at its rear end upon an axle 6 equipped with ground wheels 7. The forward end of the body 5 has a block or plate 8 secured thereto which carries a king bolt 9 which connects a depending bracket or frame 10 pivotally to the forward end of the extension or plate 8. The frame or bracket 10 carries a front axle 11 on which the ground wheel 12 is journaled and the arms of the fork 13 are mounted upon the ends of said axle 12 and connected with the draft pole or lever 14 which extends from said yoke forwardly to permit of the pulling of the truck and the operation of the lifting mechanism.

On the axle 6 a pair of crank arms 15 are mounted and keyed against relative movement thereon and each of said crank arms carries a roller 16 mounted thereon to freely rotate in either direction. On the forward ends of the sides of the body 5 a shaft 17 is journaled and on this shaft the crank arms 18 are secured, each of said crank arms carrying a roller 19 similar to the roller 16 and one of said arms 18 being located near each end of the shaft. The elevating platform 20 is provided with track faces 21 on either side thereof which are engaged by the rollers 16 and 19 as indicated in Figures 1 and 3 and said platform 20 carries at its rear end vertical guide posts 22 which are slidably associated with sockets 23 formed in the body 5 and also carries at its forward end guide posts 24 which are slidably associated with sockets 25 formed in the forward portion of the body 5.

The axle 6 carries a bifurcated crank 26 and the shaft 17 carries a similar bifurcated crank 27. The rear end of the operating rod 28 is pivotally connected with the bifurcated crank 26 and rod 28 is also pivotally connected near its forward end with the bifurcated crank 27. The forward end of the operating rod 28 is bifurcated and connected with the lever 29 which is pivoted at 30 to the extension or block 8. The lever 29 carries on its head a collar 31 providing a bearing 32 to which the link 33 is pivotally connected, the forward end of said link being pivotally connected at 34 with the collar or sleeve 35 slidably mounted upon the draft pole 14. The pole 14 carries an abutment 36 for limiting the rearward sliding movement of the collar or sleeve 35 and to receive the thrust transmitted to the draft pole when the lifting mechanism is operated.

The vertical lever 29 carries a latch 37 which is adapted to engage a notch 38 formed in the rod 28, the latch lever 37 being adapted to drop by gravity or spring pressure into said notch 38. The latch 37 is disengaged from said notch 38 by means of a trip lever 40 pivoted at 41 to the block 42 provided on the block or extension 8 of the body 5 and which trip lever is formed with a depressible foot plate 43.

When it is desired to elevate the platform 20 from the position shown in Figure 1 to the position shown in Fig. 3 the draft pole 14 is swung downwardly upon the front axle 11, thus swinging the lever 29 from the position shown in Fig. 1 to the position shown in Fig. 3 and shifting the crank arms 26 and 27 and 15 and 18 from rearwardly inclined positions in parallelism with each other to parallel vertical position. As the levers 15 and 18 are shifted forwardly the rollers 16 and 19 will roll against the underside of the platform 20 and the said platform will be elevated vertically without longitudinal or horizontal displacement, which will be prevented by the guide posts 22 and 24 and their connection with the sockets of the body 5. When the lever 29 is shifted from the position in Fig. 1 to the position shown in Fig. 3 the latch arm or lever 37 will drop into the notch 38 thus holding the elevated platform against accidental movement in the reverse direction.

It will be seen that my invention provides an elevating truck which will permit of a load being discharged directly over the position in which the truck has been placed, without danger of shifting the load during the operation of lowering the platform 20, which is affected by disengaging the latch arm or lever 37 by means of the trip lever 40 and raising the draft bar or lever 14.

Having described my invention, I claim:

1. A lifting truck comprising a wheeled body, a crank arm pivoted to the rear end of said body, a crank arm pivoted to the forward end of said body, an operating rod pivotally connected with said crank arms and holding said crank arms in parallel relation to each other, a draft pole pivoted on said body, a link having sliding connection with said draft pole and operating connection with said operating rod, and a platform supported by said crank arms and shiftable vertically on said body when said crank arms are shifted.

2. A lifting truck comprising a body, a rear axle therefor, wheels on said rear axle, crank arms on said rear axle, a front axle, means pivotally connecting the front axle to the forward part of the body, a lever pivotally connected with said front axle, a platform movable on said body, means for elevating said platform carried by said body and including an operating rod, an upright lever pivoted to said body and pivotally connected with said rod, and a link pivotally connected with the upright lever and having sliding connection with the first lever, said first lever having an abutment to receive the thrust of said sliding connection and to limit the rearward movement thereof.

3. An elevating truck comprising a body, rear wheels for supporting said body, a front support for said body and including a wheel, a platform movable on said body, guide posts carried by the front and rear end of said platform and having sliding engagement with said body, crank arms pivoted on said body and provided with means for engaging said platform, a rod pivotally connecting said crank arms in parallel relation to each other, a lever pivoted at its lower end to the forward end of said body and pivotally connected with said rod, a latch arm pivoted to said last lever and adapted to have locking engagement with said rod, and means for disengaging said lever from said rod.

Signed by me at Springfield, Mass.

JOSEPH G. TANGAUY.